LEGEND
A 3V SERIES V-TYPE
B 7M SERIES V-TYPE
C LEATHER FLAT
D NYLON CORE RUBBER FLAT
E RIBBED V-TYPE
F
F'  } PRESENT INVENTION
F"

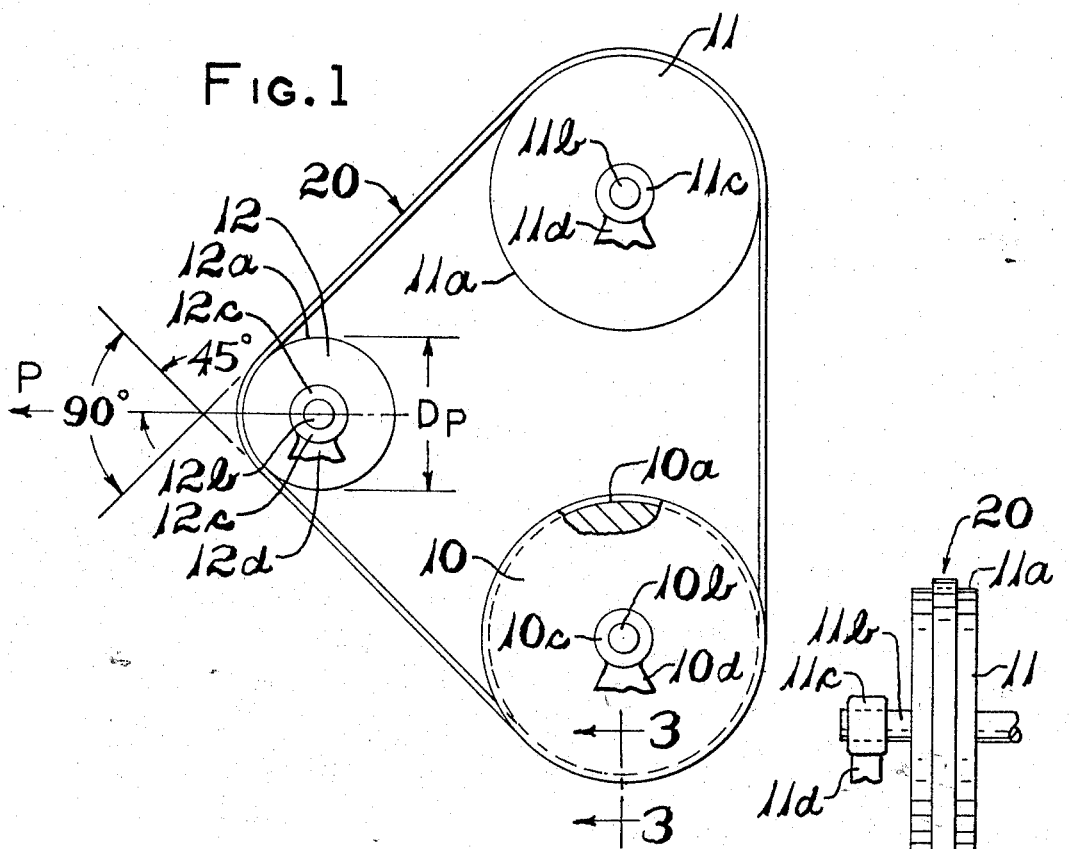

United States Patent Office 3,453,900
Patented July 8, 1969

3,453,900
POWER TRANSMISSION
Roy L. Orndorff, Jr., Kent, and John M. Foulk, Cuyahoga Falls, Ohio, assignors to The B. F. Goodrich Company, New York, N.Y., a corporation of New York
Filed Dec. 5, 1967, Ser. No. 688,167
Int. Cl. F16h 7/18, 7/08, 7/00
U.S. Cl. 74—219                                        9 Claims

ABSTRACT OF THE DISCLOSURE

A coverless flat belt and power drive incorporating such a belt characterized by the belt having a single layer of inextensible weftless warp cords imbedded in a layer of elastomeric material of high tensile modulus with a base and top layer of elastomeric material of lesser tensile modulus and adapted to transmit power between pulleys having straight cylindrical belt engaging surfaces at least one of which has belt tracking flanges.

Background of the invention

One of the more common ways of quietly transmitting power between parallel shafts at high speeds has been the familiar V-type belt. The V-belt depends upon wedging action of the belt between tapered sides of a sheave to provide driving friction on the tapered sides of the belt, whereby the belt preferably does not contact the bottom of the pulley groove. Heretofore, V-type belts have been generally thick to provide adequate transverse support for the tension resisting cords and sufficient frictional surface on the edges for transmitting driving torque to and from the pulley. Efforts to increase the amount of power transmitted by increasing belt tension, and therefore drive friction, by further wedging the belt into the sheave have not been successful. When the tension is increased in the belt, distortion of the belt cross-section occurs due to the increased tension in the reinforcing cords. The cords adjacent the pulley sheaves are supported radially by the tapered sheave sides. The cords nearest the center of the belt, lacking radial support under tension, move toward the center of the pulley such that they run in a shorter radius of curvature over the pulley. The result of this distortion of the belt cross-section is a general decrease in the tension in the central cords with an attendant increase in the tension in the outer cords. This increased tension generally causes premature failure in the outer cords.

Attempts have been made to radially support the center cords by permitting the belt, under tension, to contact the bottom of the pulley groove. Distortion of the belt cross-section is admittedly prevented by this technique. However, permitting the bottom of the pulley groove to support the belt necessarily reduces the wedging effect, that is the portion of the tension force distributed as surface frictional force on the sides of the belt in contact with the tapered pulley sides. Decreasing the friction force on the sides of the belt causes belt slippage and a loss in transmitted power. Slippage may occur either from the driver pulley to the belt, or from the belt to the driven pulley.

Because of high bending stresses and rapid belt deterioration and subsequent slippage, it is difficult to increase the power transmitted by V-type belts over small diameter pulleys. Generally, for applications such as driving automotive auxiliary equipment such as water pumps and alternators, where the power transmission requirements are increased, the shaft speed requirements are also increased. When the shaft speed is increased, it is then necessary to decrease the driven pulley diameter in order to eliminate the related increase in belt speed and vibration from kinetic imbalance. However, decreasing the pulley diameter imposes greater bending strain on the belt running over such a pulley. Running belts with thick sections over small diameter pulleys causes excessive heat built-up from the severe flexing, which in turn produces cracking and deterioration of the belt followed by premature failure. If a thinner belt is used, it can readily be seen that buckling and fatigue will occur and the surface area of the tapered sides becomes too small. Furthermore, slippage will occur again with a resultant loss in the amount of power transmitted.

It has long been felt desirable to use a flat power transmission belt in order to eliminate the problems of heating and belt cross-section distortion from driving on the side surfaces of the belt. However, it has been almost impossible, until the present invention, to transmit substantial power over small diameter pulleys at high shaft speeds with a small flat belt. The high initial tension necessary in a flat belt for transmitting the power desired causes an inelastic extension of the belt, which in turn drastically reduces the frictional driving force on the surfaces of the pulleys.

The allowable tension stress per square inch of cross-section in flat belts is limited and is generally the lowest of the several types of power transmission belts in view of the flat construction which limits the amount of reinforcement that can be built into the belt. Very often, even in low power applications, the inelastic extension of flat belts requires the use of a tension idler pulley to maintain tautness in the belt.

If, alternatively, a thin but wide flat belt is used in an attempt to transmit more power, the width must be increased by an amount sufficient to maintain the same tensile stress in the cross-section yet withstand the required increase in tension for transmitting more power. One limiting factor in the use of wide flat belts under higher tension loads is the application of radial loads over the necessarily greater unsupported length of the pulley shaft which is required to accommodate a wider belt. Increasing side load increases shaft deflection, which in turn aggravates belt tracking problems; therefore, the width of a flat belt is often limited on small diameter shafts by the allowable shaft distortion.

Another difficulty with wide flat belts arises where such belts are commonly run over crowned or convex profile pulleys to provide proper tracking of the belt over the pulley. Crowning of the pulley forces the central portion of the belt to be stretched longitudinally, as it passes over the pulley, an amount greater than the portion of the belt nearest the edge. In a wide belt, the difference in strain between the central and edge portion causes substantial variation in the stress throughout the belt cross-section. As the belt runs at high speeds over crowned pulleys, a high rate of differential stress is produced between the reinforcing cords. This differential stress, in combination with severe flexing over small pulleys, often causes premature flexural failure in the tension warp cords and resultant total belt failure.

As mentioned above, an increase in longitudinal stiffness reduces the flexibility of the belt over small diameter pulleys. Where the increase in longitudinal stiffness of the belt is due chiefly to increasing the thickness of the reinforcing cord portions, high speed flexing of the belt over small diameter pulleys tends to cause flexural fatigue of the warp or tension cords and hastens premature belt failure.

Summary of the invention

The invention disclosed herein is a coverless power transmission belt of elastomeric material reinforced with a single tension resisting layer sufficiently thin and flexible to permit rapid bending over small pulleys at high shaft speeds without producing premature flexural fatigue of the cords. The present invention provides a thin flat belt which does not rely on friction contact with its sides for power transmission and has only a single layer of warp cords for reinforcement. The cord strength is sufficient to withstand high tension, thus enabling the belt to transmit substantial power, unlike previous flat belts which have been limited to use in low power applications. The present flat belt is capable of transmitting the same power as a correspondingly thicker side-driving V-type belt, yet can operate over smaller pulleys and at higher shaft speeds without experiencing in such applications the premature flexural and tension failures encountered with V-type belts.

In the presently preferred embodiment, the tension resistant layer is formed by weftless inextensible multifilament glass cords with adjacent cords having reverse twist. The cords are embedded in a matrix of elastomeric material of high tensile modulus capable of developing high bond strength which imparts transverse stiffness to the belt and distributes differential tensile stresses imposed in the individual reinforcing cords. Vulcanized over the cord-reinforced matrix, on the inner periphery of the belt, is a base layer of elastomeric material which is uniform in thickness and less stiff than the matrix material, by virtue of a lower tensile modulus. Vulcanized over the outer periphery of the matrix material is a top layer of elastomeric material having preferably the same tensile modulus as the base layer which may have a thickness greater than, equal to, or less than that of the base.

In order to provide a flat belt structure capable of withstanding increased loads at high speeds, it is necessary to eliminate the cause and/or effects of differential cord stress and lateral vibration. These can be overcome by using crownless pulleys and by providing sufficient lateral and torsional stiffness in the belt structure. The preferred means for providing adequate torsional stiffness is the use of tension cords wherein adjacent cords have reverse twisting of the strands. This is necessary to prevent longitudinal rotation of the belt cross-section due to the unbalanced stress from the increased tension in the belt and cords. Rotation of the belt cross-section causes assymetric entry of the belt over the pulleys and causes the belt to move axially on a cylindrical pulley or "climb" the side flanges of a grooved pulley. In the case of extreme service conditions where the belt is transmitting substantial power, "flip-over" of the belt has been experienced as a result of torsional stress imbalance. Prior to the present invention, crownless pulleys have not provided proper belt tracking of flat belts and adequate transverse strength was provided in a belt by the incorporation of weft or transversely extending cords. If woven weft cords are used to stiffen a belt laterally, a corresponding increase in longitudinal stiffness is produced by the thickening of the cord reinforcement layer or layers.

The belt of the present invention having a homogeneous tension cord matrix and reverse twist in adjacent cords exhibits an inherent planar stability which enables it to track smoothly at high speeds with a minimum of vibration. The belt has a greatly reduced tendency to wander from its orbital plane. Therefore, only one pulley, preferably the driver pulley, need be flanged or grooved for proper belt tracking; whereas, the driven pulleys may have straight cylindrical surfaces for proper belt tracking without crowning or grooving. The multifilament glass cord reinforcement and thin base layer give improved flexibility to the belt, thus enabling it to run over smaller diameter pulleys than the coresponding minimum size V-type belt designed to transmit the same power. The thin base layer enables the belt to run at higher speeds over smaller pulleys without generating heat sufficient to cause deterioration in the elastomeric material. Furthermore, the inextensible glass cords prevent relaxation of the belt tension due to undesirable elongation and any corresponding reduction in frictional driving force.

*Brief description of the drawings*

FIG. 1 is a side view of the preferred embodiment of the belt and drive system arranged in a standard 3-pulley configuration for the SAEJ637 test.

FIG. 2 is an edge view of the system of FIG. 1 showing the grooved driver pulley and the straight cylindrical driven pulleys.

FIG. 3 is a partial sectional view taken along the section indicating lines 3—3 of FIG. 1 showing the details of the driver pulley groove and the belt cross-section.

FIG. 4 is a view illustrating in cross-section a different embodiment of the belt.

*Detailed description*

Figure 5:
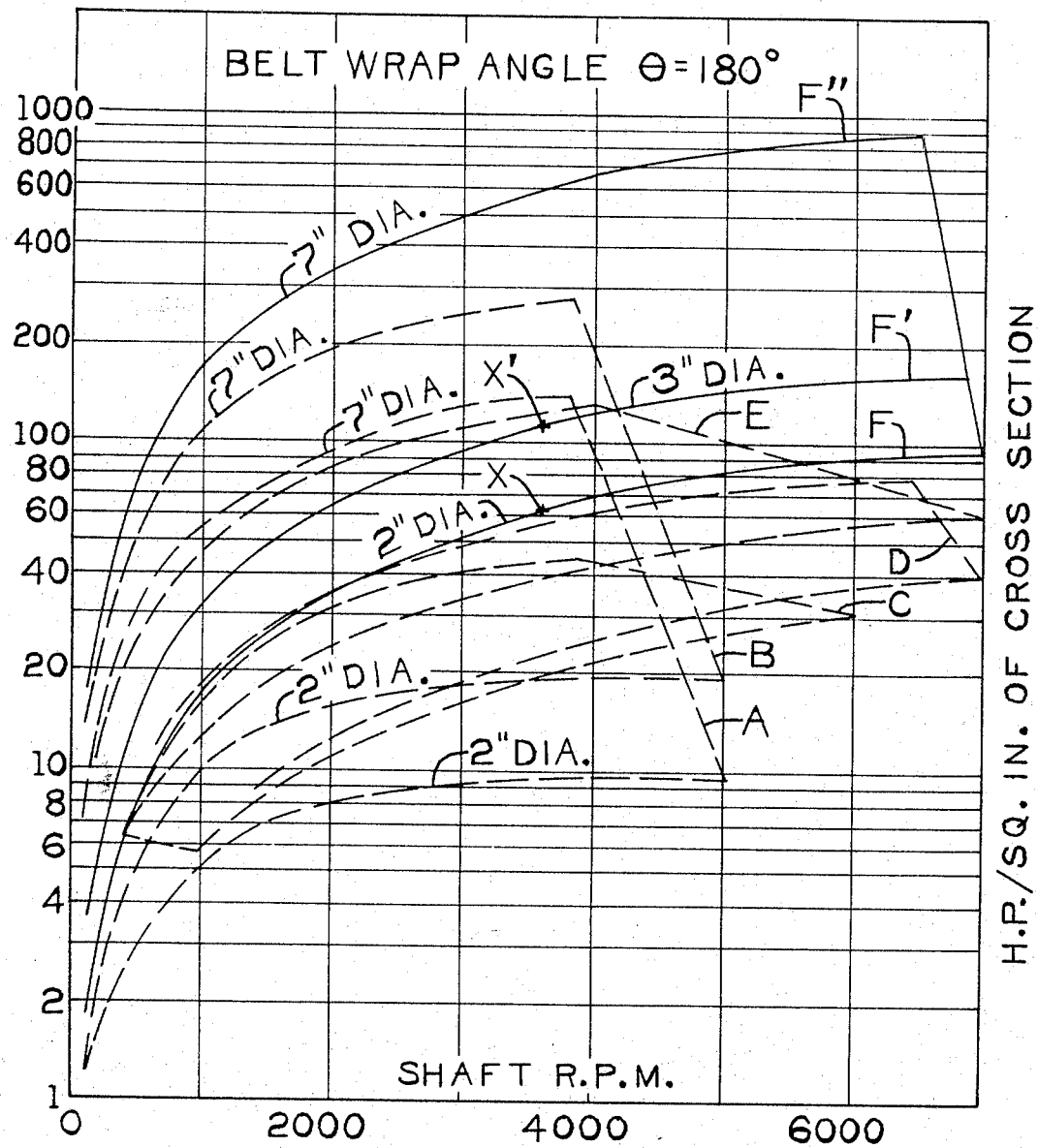
FIG. 5 is a graph of Power Density, expressed in units of horsepower per square inch of belt cross-section, plotted against pulley shaft speed, expressed in units of revolutions per minute, wherein the graph contains separate superimposed plots for various types of power transmission belts.

Referring now to FIGS. 1 and 2, belt 20 is shown installed in the standard SAEJ637 test set-up having a driver pulley 10 and two driven pulleys 11 and 12 with the belt forming an essentially isosceles right triangle with driver pulley 10 and driven pulley 11 forming the base vertices and the smaller idler pulley 12 forming the apex. The idler pulley 12 has a shaft 12b rigidly attached centrally therethrough, a bearing 12c for free rotation of the shaft therein and a rigid supporting mount 12d for the bearing. The idler pulley 12 has a straight cylindrical perimeter 12a for making frictional contact with the belt 20 in a driving manner. In the illustrated embodiment, the idler pulley 12 has a pitch diameter of 2″ and driver pulley 10 and the driven pulley 11 each have a pitch diameter of 4¾″. However, the present invention is not limited to a drive having pulleys of these dimensions and arranged in the illustrated configuration. Any of numerous drive systems of at least two pulleys may be used. The pulley diameters are usually limited only by the desired shaft speed ratios of the system and may differ from those shown in the arrangement depicted in the drawings.

The driver pulley 10 has a flat bottomed groove 10a around its periphery, as shown in the broken away portion of pulley 10 in FIG. 3, for providing proper tracking and frictional contact with the belt 20. The pulley 10 is rigidly fixed to a shaft 10b in a manner such as to prevent relative rotation therebetween and the shaft is free to rotate in a bearing 10c which is supported by the rigid support means 10d. The driven pulley 11 has a straight cylindrical periphery 11a, a rigid shaft 11b, affixed centrally therethrough, so as to prevent relative rotation therebetween, a bearing 11c for permitting free rotation of the shaft 11b and a rigid support structure 11d for supporting the bearing.

The continuous flat belt 20 is installed over the groove 10a in the driver pulley 10 and over the cylindrical surface 12a of the pulley 12 and over the flat cylindrical surface 11a of the driven pulley 11. The belt is tensioned by moving the pulley support structure 12d, in the direction P perpendicular to the line between the centers of driver pulley 10 and driven pulley 11, in such a manner as to increase the distance between the driver pulley and the idler pulley 12. However, tension adjustment may be made by moving any or all of the other pulley supports and is not limited to the pulley adjustment means of the standard automotive test configuration shown in the drawings.

Referring now to FIG. 2, the belt and pulley arrangement of FIG. 1 is shown in an end view which displays the groove 10a in the driver pulley 10 in more detail and shows the presently preferred form of the driven pulleys wherein the overall width of the driven pulleys is at least 1½ times the width of the belt. The groove in the driver pulley 10 is shown in its required form where the bottom of the groove 10a is equal to or greater than the width of the belt.

Referring now to FIG. 3, the construction of the belt and the shape of the pulley groove are shown in greater detail. As mentioned above, the width of the bottom 10a of the pulley groove is shown greater than the width of the belt but is preferably not more than 150% of the belt width. The sides 10a' of the groove are generally straight and taper outwardly away from the bottom of the groove. In the presently preferred form of the invention, the pulley groove sides are tapered outwardly making an angle in the range 10 to 25° with a plane perpendicular to the axis of the pulley. The depth of the pulley groove is at least equal to the total thickness of the belt 20, but is preferably not greater than 120% of the belt thickness $t$. The belt 20, as shown in FIG. 4, has a substantially rectangular transverse cross-sectional shape. However, the belt may have a trapezoidal cross-section, where the sides of the belt taper either inwardly or outwardly and the invention is not limited to the rectangular shape shown in the drawings.

If a trapezoidal belt cross-section is used, the taper of the sides must be such that the sides of the belt are not forced into driving contact with the tapered sides of the pulley groove. In other words, the pulley groove must remain equal to or wider than the belt at any given point on the side 10a' of the groove adjacent a corresponding point on the edge of the belt 20.

The preferred embodiment of the belt 20, see FIG. 3, has a single layer of reinforcing cords 20a lying in a plane parallel to the bottom of pulley groove 10a. The multifilament cords are preferably made of an inextensible filament and/or finely stranded material having a tensile modulus greater than $6 \times 10^6$ p.s.i. In the preferred embodiment, the cords are made of glass fiber material having a filament diameter of 0.00037 in. and are coated with a suitable primer such as resorcinol formaldehyde latex. However, any other suitable material such as finely stranded steel wire may be used for the cords. The construction of the cord is of such type as to have very low stiffness or slight resistance to bending and yet remain longitudinally inextensible. The cords are in closely, generally equally spaced, parallel relationship with the distance between the centers of adjacent cords having a maximum equal to 1.2 multiplied by the cord diameter $d_c$, see FIGS. 3 and 4. The cord diameter $d_c$ is necessarily less than 2% but greater than 0.3% of the diameter D$p$ of the smallest pulley over which the belt 20 is to run. Limiting the diameter of the cords $d_c$ to a small percentage of the pulley diameter D$p$ gives sufficient flexibility to the cords to enable them to run at high speeds over small pulleys without causing premature flexural failure in the cords 20a.

A matrix 20b of elastomeric material is bonded to the cords 20a thereby forming a continuous coextensive layer. The matrix 20b is preferably limited in thickness to substantially the diameter $d_c$ of the cords 20b. The matrix is made of elastomeric material having a 100% tensile modulus in the range 600 to 2000 p.s.i., with a durometer hardness of 70 to 100 on the Shore A scale and must be capable of developing a room temperature shear bond strength of at least 1000 p.s.i. at the bond interface of the matrix 20b and the surface of the cord 20a as measured in double shear. The matrix is made of methylene bis-4-phenolisocyanate intermixed with neoprene in the presently preferred belt; however, any suitable elastomeric material having the above-mentioned properties may be used.

When the assembled belt is vulcanized, the matrix 20b forms a tough, resilient, yet flexible tension resistant core for the belt 20. The high tensile modulus of the matrix 20b coupled with the strength of the bond to the cords 20a enables the matrix 20b to transmit differential strains in a manner which tends to equalize tension stresses between individual cords, thereby holding the cords in proper position. When the belt is running under high tension loads, the matrix 20b gives improved torsional and transverse stiffness to the belt to enable it to track properly over the crownless straight cylindrical driven pulleys 11 and 12 and provides the necessary increase in flex-fatigue life required for increased power transmission.

A generally thin and flat base layer 20c of elastomeric material, preferably neoprene, is bonded to the inner periphery or face of the matrix 20b and has a flat outer surface adapted to drive on the surfaces of the pulleys. The base layer 20c is made of an elastomeric material having a 100% tensile modulus in the range 600 to 2000 p.s.i. but less than the modulus of the matrix 20b, with durometer hardness in the range 70 to 100 on the Shore A scale and abrasion resistance in the range 85–350 for 80 revolutions of a sample tested per ASTM D–2228–63T. Furthermore, the tensile modulus of the base 20c must not be greater than the tensile modulus of the matrix 20b and preferably the hardness of the base is less than that of the matrix 20b.

The thickness of the base 20c is established such that the perpendicular distance $b$, see FIGS. 3 and 4, from a line through the center of the cords to the outer face of the base layer is in the range of 100% to 300% of the diameter $d_c$ of the cords 20a. When the belt is under tension, the base layer functions as a support for the corded matrix layer 20b thereby maintaining the cords 20a in their initial planar arrangement and preventing distortion of the belt cross-section. Limitation is imposed on the distance $b$ from the center of the cords to the outer face of the base 20c in order to reduce the bending stiffness and compressive stresses thus maintaining the cords in their proper position. The abrasion resistance of the base 20c enables the belt to maintain the required traction on the pulley surface permitting the transmission of loads at the high power densities, for which the present belt is most useful.

A flattop layer 20d of elastomeric material preferably neoprene is bonded to the face of the matrix 20b on the side opposite the base 20c. The top 20d is made of elastomeric material having a 100% tensile modulus in the range 600 to 2000 p.s.i. but less than the modulus of the matrix 20b with durometer hardness in the range 70–100 on the Shore A scale and preferably less than the hardness of the matrix 20b. The thickness of the top is preferably greater than ¾ of the cord diameter $d_c$.

The belt is constructed by dipping the cords 20a in a primer cement and then imbedding them in the unvulcanized matrix material 20b with adjacent cords having reverse twist. The cords are preferably assembled onto the belt by winding over the base layer which is mounted in band form on a drum. The base 20c and the top 20d are then bonded in the uncured state, the base to the inside and the top to the outside of the matrix layer. The complete assemblage of the belt is then vulcanized as a unit to form a finished belt.

In the preferred embodiment of the invention shown in FIG. 3, the belt has a trapezoidal cross-section in which case the width W of the widest base of the trapezoidal is at least 150% of the altitude $t$ of the trapezoid.

Referring to FIG. 4, another embodiment of the belt 30 is shown having rectangular cross-section with its width W at least 150% of the total belt thickness $t$ and has cords 30a, matrix 30b and base 30c similar to the corresponding parts of the belt of FIG. 3 but has a top layer 30d having its thickness equal to that of the base 30c. The belt of FIG. 4 is adapted for contacting a pulley on the outer face of the base 30c and on the top layer face of the top 30d for driving on either or both sides. The embodiment of FIG. 4 thus permits pulley arrangements requiring less space than those in which power may be transmitted only on one side of the belt. The top 30d functions in the same manner for externally reducing flexing as does the base 30c for internal radius flexing and thereby enables the belt to run with reverse flexure.

The present flat belt can operate under a generally greater static tension and consequently greater dynamic tension for any given power transmission requirement than that possible for the corresponding V-type belt designed for the same application. It is for this reason that the present belt can transmit greater power with a smaller cross-section than other commercially known types of belts. When made in accordance with the above description, the present belt is capable of sustaining heretofore unobtainable flat belt power densities in transmitting power between shafts having small pulleys. When run over the pulley arrangement of FIG. 1, in accordance with the specifications of SAEJ637, with pulley 12 having a diameter of 2 inches and pulleys 10 and 11 each having a diameter of 4¾ inches, the belt illustrated has a width of 5/16 inch and a thickness of substantially 0.12 inch with a belt length of 41 inches and has been tested and found capable of transmitting 14 horsepower between pulleys 10 and 11 at 4900 r.p.m. at a power density of 350 HP/in.$^2$ of belt cross-sectional area for a minimum life of 75 hours and a maximum of 200 hours.

The SAE life requirements for the J637 test require a minimum of 25 hours continuous operation without any belt failures; moreover, a standard or conventional "3V" size automotive V-belt which meets the requirements of SAEJ637 will transmit power at a maximum density of 172 HP/in.$^2$ for 30–40 hours continuously without failure. This comparison, by use of the SAEJ637 test, readily discloses the unusual results obtained whereby the present small flat belt out-performs by a substantial amount well known V-type power transmission belt.

Referring now to FIG. 5, values of "Power Density" expressed in units of horsepower per square inch of belt cross-section are plotted graphically as the ordinate against pulley shaft r.p.m. as the abscissa, with the various values of pulley diameter held constant for each plot. Separate curves are shown for various integer pulley sizes ranging from 2 to 7 inches in diameter. The heavy black curves, including the straight line connecting their ends, labeled F, F' and F'' in FIG. 5 represent curves drawn through calculated values of power density for different values of horsepower and r.p.m. for 2", 3" and 7" diameter pulleys respectively. The heavy lines enclose a region in which curves for intermediate values of pulley diameters will lie.

The dashed-line curves, including the dashed lines connecting their ends in pairs, labeled A–E inclusive, are corresponding curves for the various known commercial V-type and flat power transmission belts and each set of dashed curves is identified as to type by a legend in FIG. 5. These curves were plotted from manufacturers' published design data for the various individual belt sizes and are used as a basis for establishing the shape of the curves for the present invention. It can be readily seen from FIG. 5 that for any given pulley diameter and r.p.m., the present belt transmission system can transmit greater power, e.g., more power with the same size belt, or alternatively, the same power with a smaller belt which includes intermediate combinations of power and belt size, than the other commercially known belts. FIG. 5 is thus a graphical means of displaying this unique feature of the disclosed power transmission system. The curves A–F of FIG. 5 have been plotted for a two-pulley system not illustrated. Values for the curves were therefore computed for a belt wrap-angle of 180°. Both sets of curves, i.e., the solid line curves for the present invention and the dashed-line curves for the other commercial type of belts, are plotted for the power density regimes and range of pulley diameters in which the invention is applied in its presently preferred form. The minimum and maximum pulley diameters for which values of power density were calculated ranged from 2 to 7 inches, however; the invention is not limited in its application to any particular pulley diameter or combination of the latter, the curves merely embrace the range of pulley sizes which are encountered in the more common applications, for example, automotive engine fans, pumps and alternators.

The values of horsepower density for the present invention, labeled curves F, F' and F'' in FIG. 1, were computed by assuming a value of three for the ratio of dynamic "taut" side tension $T_1$ to "slack" side tension $T_2$. For any given pulley diameter, the cord diameter $d_c$ was chosen in accordance with the above described geometric relationship, namely, that the cord diameter $d_c$ is greater than 0.3% but does not exceed 2% of the pulley diameter; for example, a 2.0" diameter pulley with a belt having a cord diameter $d_c$ of 0.009 inch. From stress-strain curves for fiberglass material, it has been determined that breaking occurs commonly at 3.5 to 4% tensile strain; therefore, 3.5% strain has been assumed as the breaking strain and the breaking load computed for various sizes of fiberglass cord. If the number of cords per inch of belt width are known, then the breaking strength of the belt, per inch of width, can be approximated for uniform load by simply multiplying the breaking strength per cord by the number of cords per inch. The breaking strength of the belt per inch of width is then reduced by 80% to provide for the effects of flexural and static fatigue. The determination of the number of cords per inch of belt width is a matter of choice between the maximum number possible with adjacent cords contacting each other which is expressed by the formula $$N = 1/d_c$$

where N equals the number of cords per inch of width, and a minimum number determined by the formula $$N = .8/d_c$$

Typical examples of combination of cord sizes and pulley diameters used for calculating the breaking strength of the belt are shown in Table I.

TABLE I

| 1 | 2 | 3 | 4 | 5 | 6 | 7 | 8 |
|---|---|---|---|---|---|---|---|
| Dp | Cord | $d_c$ | Break str. lbs./ cord | Break str. lbs./ inch width | Max. cords per inch | Chosen cords/ inch width | Maximum design strand tension, lbs./in. width |
| 0.7–2.0 | 4e [1] | 0.009 | 21 | 2,100 | 111 | 100 | 400 |
| 2.0–7.0 | 20e [1] | 0.030 | 100 | 3,000 | 33 | 30 | 620 |
| 7.0 | 150e [1] | 0.095 | 500 | 4,750 | 10.5 | 9.5 | 905 |

[1] e = Number of ends per cord with 204 monofilaments per end for ECG 150's glass cord.

Before equating the maximum strength of the belt, per inch of width (Column 8, Table I) to the maximum tension, the strength is derated, or decreased, by the amount of tension induced by centrifugal force. The tension induced by centrifugal force $F_c$, per inch of belt width for a belt with a specific gravity of 1.4 grams/cc. is determined for any given r.p.m. and pulley size by the formula $$F_c = .23 V^2 t$$

where V is the belt speed in feet per second, as determined by the product of the pulley radius, $d_c/2$, multiplied by $2\pi$ and that product multiplied by the pulley r.p.m., and $t$ is the thickness of the belt in feet chosen in accordance with the relationship $$4b \geq t \geq b + \tfrac{3}{4}d_c$$

where $b$ is, as previously defined, the distance from base edge to the center of the cords. The maximum belt tension allowable per inch of width $T_{1\ max.}$ can then be determined by the formula $$T_{1\ max.} = T_1 - F_c$$

The "slack" side tension $T_2$ is readily determined from the tension ratio:

$$T_1/T_2 = 3$$

or $$T_2 = T_1/3$$

The difference between $T_1$ and $T_2$ is the available driving force or "net pull" on the pulley.

The power transmitted per inch of belt width can then be determined from the driving tension as follows:

$$Hp/in. = \frac{(T_1 - T_2)/\text{inch} \times f \times Dp}{1.26 \times 10^5}$$

where $Hp/in.$ is the power per inch width, $f$ is the r.p.m. of the pulley and $Dp$, as shown in FIG. 1, is the pulley diameter in inches. If pulley systems are used having belt wrap-angles of less than 180°, for example in the SAEJ637 arrangement of FIG. 1, the belt tension $T_1$ must be increased proportionately similar to standard belt design procedures. Thus, the curves of FIG. 5 have been plotted for typical belts designed according to the above procedure, having the dimensions set forth in Table II. Summarizing the calculations for FIG. 5, Table II

|  | Inches |
|---|---|
| $d_c$ | .030 |
| $w$ | 1 |
| $t$ | .125 |
| $Dp$ | 2.0–7.0 |

The width and thickness dimensions of Table II were chosen within the limits for the belt set forth in the above description, namely that $$w/t \geq 1.5$$

and $$b + \tfrac{3}{4}d_c \leq t \leq 4b$$

where $$.003Dp \leq d_c \leq .020Dp$$

for values of pulley diameters in the range 2–7 inches. Values of horsepower density were then computed from the above described formula by assuming a breaking strain 3.5% for the fiberglass reinforcing cord and assuming a fatigue-stress multiplier of 0.2 for computing the maximum design tension and then decreasing that tension by the effect of centrifugal force for any given r.p.m. and pulley diameter to obtain the allowable tension. Having the allowable tension $T_1$, the "net pull," $T_1-T_2$, is determined after finding the slack side tension $T_2$ from the tension ratio. When $T_1-T_2$ is known, the value of horsepower density can be computed from the above formula for power density for a given r.p.m. The values thus found have been plotted as an ordinate in FIG. 5 against r.p.m. as the abscissa. This has been done for pulley diameters of 2, 3 and 7 inches and for values of r.p.m. ranging from 100–7000; wherein the points have been plotted to give the resultant curves labeled F, F' and F'' in FIG. 5.

Similar curves have been plotted for standard cross-sectional sizes of commercial V-belts and flat belts using the manufacturers' data and are shown as curves A–E in FIG. 5.

Tests were conducted to verify the curves F for the present invention and the results are identified as point X on the curve F for 2 inch diameter pulley running at 3600 r.p.m. and point X' on the curve F' for 3 inch diameter pulleys running at 3600 r.p.m. The belt wrap-angle $\theta$ over the pulleys was 180°; thus a two pulley system, not illustrated in the figures, was used for the test for convenience of comparison of results. Table III gives the dimensions of the belt and a tabulation of the test data.

TABLE III

|  | Belt width, inch | Belt length | Edge taper, deg. | Total, HP. | Pulley tension, $T^1-T^2$ | Wrap angle, deg. | Dp | R.P.M. | Test stopped[1] without failure, hrs. |
|---|---|---|---|---|---|---|---|---|---|
| Test point: |  |  |  |  |  |  |  |  |  |
| X | 5/16 | 41 | 10 | 2.64 | 92# | 180 | 2.0 | 3,600 | 334 |
| X[1] | 5/16 | 41 | 10 | 3.02 | 70.5# | 180 | 3.0 | 3,600 | 334 |

[1] Both belts were removed from test at 334 hours. No significant change in power transmission had occurred during the 334 hour test.

The presently preferred power transmission system thus comprises an elastomeric flat belt reinforced with glass cords which runs over a flat grooved driver pulley and crownless flat driven pulleys. The system is capable of transmitting power at high shaft speeds in amounts sufficient to permit its use in applications heretofore reserved for side driving belts, normally those of the well known V-type.

We claim:

1. A continuous flat power transmission belt having a generally rectangular cross-section comprising:
   (a) a plurality of substantially inextensible warp cords in a single planar layer in generally closely spaced parallel relationship;
   (b) a matrix layer of elastomeric material encompassing said cords;
   (c) a flat base layer of elastomeric material bonded to the inner periphery of said matrix and provided with an outer surface adapted to contact the surface of a pulley; and
   (d) a top layer of elastomeric material bonded to the face of said matrix opposite said base, wherein:
      (i) said cords are of filamentary material having a tensile modulus of at least $6 \times 10^6$ p.s.i.,
      (ii) said matrix has a 100% tensile modulus in the range 600–2000 p.s.i. and is limited in thickness to substantially the diameter of the largest of said cords,
      (iii) said matrix, base and top are vulcanized integrally with a bond strength of at least 1000 p.s.i. therebetween,
      (iv) the perpendicular distance (b) from a plane through the centers of said cords to the outer surface of said base is in the range of 100% to 300% of the diameter of said cords, and
      (v) the width of said belt is at least one and one-half multiples of its thickness.

2. The belt as defined in claim 1, wherein:
   (a) said cords are of glass fiber material of equal diameter, adjacent cords having reverse twist with each cord having an elastomeric primer coated thereon;
   (b) said matrix is of neoprene inter-mixed with methylene bis-4-phenylisocyanate having a durometer hardness in the range 70 to 100 on the Shore A scale;

(c) said base and said top are made of neoprene compounded elastomer each having a 100% tensile modulus in the range 600–2000 p.s.i. but not exceeding that of said matrix.

3. The belt as defined in claim 1, wherein:

(a) said base has abrasion resistance in the range 85–350 for 80 revolutions of a sample tested per ASTM D2228–63T;

(b) the number of cords per inch of belt width is not less than $$N = .8/d_c$$

where N equals the number of cords per inch of belt width, and $d_c$ is the diameter of the cords.

4. The belt defined in claim 3, wherein said top and said base layers are of equal thickness and said belt is adapted to contact a pulley on the outer surface of both said base and said top.

5. In a power transmission system having a continuous flat belt with a trapezoidal cross-section interconnecting at least two pulleys for transmitting therebetween 14 HP per the test requirements of SAEJ637 at a minimum power density of 350 HP per square inch of belt cross-sectional area, the improvement comprising:

(a) a core layer of tension resistant yet flexible construction having opposite parallel faces having inextensible cords in closely spaced parallel relation imbedded in a matrix of elastomeric material, wherein said cords are made of a material with a tensile modulus of at least $6 \times 10^6$ p.s.i. and said matrix is made of elastomeric material with a 100% tensile modulus in the range 600–2000 p.s.i.;

(b) a flat base layer of elastomeric material integrally bonded to one face of said core, the exposed flat surface of said base being adapted for contacting a pulley in a driving manner; and (c) a flat top of elastomeric material integrally bonded to the opposite face of said core, wherein one of said pulleys has belt tracking flanges formed by a flat-bottomed groove with width equal to or greater than said belt and each of the other pulleys has a straight cylindrical belt driving periphery concentric with the pulley shaft.

6. A power transmission system in combination comprising:

(a) at least two spaced pulleys rotating in the same plane about parallel shafts;

(b) a continuous flat belt connecting said pulleys, wherein:

(i) one pulley has a flat-bottomed groove circumferentially therearound, (ii) the remaining pulleys each have straight cylindrical surfaces adapted to contact the surface of said belt, (iii) the total width of said belt is at least 150% of its thickness, (iv) said belt has a plurality of substantially inextensible warp cords embedded therein in a parallel relationship, single planar layer in generally closely spaced (v) said belt has a matrix layer of elastomeric material encompassing said cords, (vi) said belt has a flat base layer of elastomeric material bonded to the inner periphery of said matrix and provided with an outer surface adapted to contact the surface of a pulley, (vii) said belt has a top layer of elastomeric material bonded to the face of said matrix opposite said base, (viii) said matrix, base and top are vulcanized integrally developing a bond strength of 1000 p.s.i. therebetween, (ix) said belt has the diameter $d_c$ of the cords less than 2% but greater than 0.3% of the diameter $Dp$ of the smallest pulley in the system and the perpendicular distance $b$ from the outer face of said base to the center of said cords at least 100% but not greater than 300% of diameter $d_c$ of cords, (x) said belt has its width at least 150% of its total thickness.

7. The system defined in claim 6, wherein:

(a) said cords are of fibrous material having a tensile modulus of at least $6 \times 10^6$ p.s.i. with adjacent cords having reverse twist;

(b) said matrix has a 100% tensile modulus in the range 600–2000 p.s.i. and is limited in thickness to the diameter of the largest of said cords;

(c) the width of each of said straight cylindrical pulleys is at least 150% of the width of said belt and said system is capable of continuously transmitting for 300 hours 3.0 HP from a driver to a driven pulley at 3600 r.p.m. at a minimum power density of 63 HP per square inch of belt cross-sectional area, both of said pulleys being two inches in diameter.

8. The system defined in claim 6 wherein each side of said flat-bottomed groove tapers outwardly substantially 10°–25° to a plane perpendicular to the axis of said driver pulley.

9. The system as defined in claim 6 wherein:

(a) said matrix is of neoprene mixed with methylene bis-4-phenylisocyanate; and (b) said base and said top are of neoprene compounded elastomer each having a 100% modulus in the range 600–2000 p.s.i. but not exceeding that of said matrix.

References Cited

UNITED STATES PATENTS

| | | | |
|---|---|---|---|
| 2,484,810 | 10/1949 | Bacon et al. | |
| 2,726,976 | 12/1955 | Waugh | 74—233 |
| 2,739,090 | 3/1956 | Waugh | 74—232 |
| 2,892,748 | 6/1959 | Runton | 74—232 |
| 3,387,500 | 6/1958 | Hutzenlaub et al. | 74—231 |

FRED C. MATTERN, *Primary Examiner.*

J. A. WONG, *Assistant Examiner.*

U.S. Cl. X.R.

74—232

PO-1050
(5/69)

UNITED STATES PATENT OFFICE
CERTIFICATE OF CORRECTION

Patent No. __3,453,900__  Dated __July, 1969__

Inventor(s) __ROY L. ORNDORFF, JR. and JOHN M. FOULK__

It is certified that error appears in the above-identified patent and that said Letters Patent are hereby corrected as shown below:

Column 10, following Table 3 and before line 34, insert:

---The test points verify the curves F and F' of Fig. 5 and thereby demonstrate the advantages of the present invention.---

SIGNED AND
SEALED

SEP 30 1969

(SEAL)
Attest:

Edward M. Fletcher, Jr.
Attesting Officer

WILLIAM E. SCHUYLER, JR.
Commissioner of Patents